(12) United States Patent
Shiobara et al.

(10) Patent No.: US 10,951,783 B2
(45) Date of Patent: Mar. 16, 2021

(54) MEDIA PROCESSING APPARATUS IN RECORDING SYSTEM INCLUDING SEPARATE UNITS WITH NON-OVERLAPPING PROCESSING PORTIONS

(71) Applicant: SEIKO EPSON CORPORATION, Tokyo (JP)

(72) Inventors: Hiroshi Shiobara, Matsumoto (JP); Hirohisa Adachi, Matsukawa-machi (JP); Kohei Ueno, Matsumoto (JP); Kazuyoshi Ohashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/676,009

(22) Filed: Nov. 6, 2019

(65) Prior Publication Data

US 2020/0153988 A1    May 14, 2020

(30) Foreign Application Priority Data

Nov. 8, 2018  (JP) .............................. JP2018-210654

(51) Int. Cl.
  *H04N 1/00* (2006.01)
(52) U.S. Cl.
  CPC ..... *H04N 1/00538* (2013.01); *H04N 1/00557* (2013.01); *H04N 1/00631* (2013.01); *H04N 1/00639* (2013.01)
(58) Field of Classification Search
  CPC ........... H04N 1/00538; H04N 1/00557; H04N 1/00631; H04N 1/00639; B65H 31/22; B65H 2405/31; B65H 2405/312; B65H 2405/313; G03G 15/6538; G03G 15/6541; G03G 15/6544; G03G 15/6582; G03G 2215/00822; G03G 2215/00827;
  (Continued)

(56) References Cited

U.S. PATENT DOCUMENTS 8,109,497 B2   2/2012  Okamoto et al.
8,332,065 B2 *  12/2012  Kurakata ............... B65H 31/20
                                                    700/217
(Continued)

FOREIGN PATENT DOCUMENTS

CN      101565135      10/2009
CN      107235367      10/2017
(Continued)

*Primary Examiner* — Scott A Rogers
(74) *Attorney, Agent, or Firm* — Workman Nydegger (57) ABSTRACT

A media processing apparatus includes a first unit including a first receiving portion that receives media, a first processing portion that performs first processing on the media received from the first receiving portion, and a sending portion that sends out media received from the first receiving portion without passing through the first processing portion; and a first tray that is provided outside the first unit and that receives media discharged from the first unit after the first processing has been performed thereon, in which the first unit is configured such that the second unit is detachably attached below the first tray, the second unit including a second receiving portion configured to receive the media sent from the sending portion and a second processing portion that performs second processing on the media received from the second receiving portion.

20 Claims, 7 Drawing Sheets

(58) Field of Classification Search
CPC .......... G03G 2215/00831; G03G 2215/00848; G03G 2215/00856; G03G 2215/00864
See application file for complete search history.

(56) References Cited

U.S. PATENT DOCUMENTS

| | | | |
|---|---|---|---|
| 8,947,683 B2* | 2/2015 | Tominaga | H04N 1/0044 358/1.13 |
| 9,030,687 B2* | 5/2015 | Okada | G06K 15/00 358/1.14 |
| 10,044,902 B2* | 8/2018 | Unno | B42C 19/02 |
| 2006/0239771 A1* | 10/2006 | Hayashi | B65H 1/26 403/300 |
| 2009/0261521 A1 | 10/2009 | Okamoto et al. | |
| 2017/0283204 A1 | 10/2017 | Awano et al. | |
| 2019/0367312 A1* | 12/2019 | Kishimoto | B65H 29/247 |
| 2020/0171857 A1* | 6/2020 | Ueno | B42B 4/00 |
| 2020/0172360 A1* | 6/2020 | Ueno | B65H 7/02 |
| 2020/0198919 A1* | 6/2020 | Harada | G03G 15/6582 |

FOREIGN PATENT DOCUMENTS

| | | |
|---|---|---|
| JP | 2012-148902 | 8/2012 |
| JP | 2018-150097 | 9/2018 |

* cited by examiner

MEDIA PROCESSING APPARATUS IN RECORDING SYSTEM INCLUDING SEPARATE UNITS WITH NON-OVERLAPPING PROCESSING PORTIONS

The present application is based on, and claims priority from JP Application Serial Number 2018-210654, filed Nov. 8, 2018, the disclosure of which is hereby incorporated by reference herein in its entirety.

BACKGROUND

1. Technical Field

The present disclosure relates to a media processing apparatus that performs processing on media, an apparatus unit that attaches to the media processing apparatus, and a recording system including the media processing apparatus.

2. Related Art

Some media processing apparatuses that perform predetermined processing on media are configured to execute a plurality of processing operations on the media. For example, as processing to be performed on the media, there are stapling processing, punching processing, and saddle stitching processing in which a plurality of media are stacked and centers thereof in the width direction are bound.

Further, such a media processing apparatus may be incorporated in a recording system capable of continuously executing processing from recording on media in a recording apparatus represented by an ink jet printer to post processing such as performing stapling processing on the media after recording has been performed thereon.

One example of such a media processing apparatus includes a first processing portion, which performs binding processing (stapling processing) as first processing, and a second processing portion, which performs saddle stitching processing as second processing (for example, JP-A-2018-150097 or JP-A-2012-148902).

In the media processing apparatus described in JP-A-2018-150097, the first processing portion and the second processing portion are kept in the same casing. When a plurality of processing portions are provided in the same casing, the ease of clearance of a media jam in the apparatus and the ease of maintenance may be reduced.

In the media processing apparatus described in JP-A-2012-148902, a saddle stitching apparatus as the second processing portion is provided outside a casing provided with an end binding apparatus as the first processing portion. The second processing portion is disposed above a binding receiving receptacle that receives a media bundle processed by the first processing portion, and it becomes difficult to take out the media from the binding receiving receptacle.

In addition, there is a need for a configuration that allows, for example, the user to easily add a second processing portion as an option to the media processing apparatus including the first processing portion so as to allow the user to select required processing functions in the media processing apparatus.

SUMMARY

According to an aspect of the disclosure, a media processing apparatus includes a first unit that includes a first receiving portion that receives media, a first processing portion that performs first processing on the media received from the first receiving portion, and a sending portion that sends out media received from the first receiving portion without passing through the first processing portion, and a first tray that is provided outside the first unit and that receives media discharged from the first unit after the first processing has been performed thereon, in which the first unit is configured such that a second unit can be detachably attached below the first tray, the second unit including a second receiving portion that receives the media sent out from the sending portion, and a second processing portion that performs second processing on the media received from the second receiving portion.

DESCRIPTION OF EXEMPLARY EMBODIMENTS

Hereinafter, the present disclosure will be schematically described.

A media processing apparatus according to a first aspect of the disclosure includes a first unit that includes a first receiving portion that receives media, a first processing portion that performs first processing on the media received via the first receiving portion, and a sending portion that sends out media received via the first receiving portion without passing through the first processing portion, and a first tray that is provided outside the first unit and that receives media discharged from the first unit after the first processing has been performed thereon, in which the first unit is configured such that a second unit can be detachably attached below the first tray, the second unit including a second receiving portion that receives the media sent out from the sending portion, and a second processing portion that performs second processing on the media received via the second receiving portion.

According to this aspect, since the second unit is configured to be detachably attached to the first unit, the media processing apparatus can easily switch between a configuration in which the first unit and the second unit are connected, and which has both a first processing function and a second processing function, and a configuration in which the second unit is removed from the first unit and only the first processing function is provided.

In addition, since the first processing portion and the second processing portion are provided as separate units, it is possible to improve the ease of clearance of a media jam in the apparatus and the ease of maintenance of each processing portion.

In addition, since the second unit is disposed below the first tray when the second unit is attached to the first unit, the possibility of the second unit impeding removal of media discharged to the first tray can be eliminated.

In a second aspect according to the first aspect, the first unit includes an attachment target portion for attachment of the second unit by being connected to an attachment portion provided on the second unit, and the first unit and the second unit are electrically connected by connecting the attachment portion and the attachment target portion to each other.

According to this aspect, both the mechanical connection and the electrical connection between the first unit and the second unit can be formed by connecting the attachment portion and the attachment target portion to each other.

In a third aspect according to the first aspect or the second aspect, when the second unit is attached to the first unit, a casing forming an external appearance of the second unit overlaps the first tray in a media discharge direction from the first unit.

According to this aspect, the casing forming the external appearance of the second unit can be configured so as not to protrude from the first tray in the media discharge direction from the first unit, and the media processing apparatus can be disposed in a space-saving manner.

In a fourth aspect according to the third aspect, when the second unit is attached to the first unit, a portion of the first tray is provided downstream of the casing in the media discharge direction from the first unit.

In a fifth aspect according to any one of the first to fourth aspects, when the second unit is attached to the first unit, the first tray is provided to be shifted upstream in a media discharge direction with respect to a portion of a second tray that receives the media discharged from the second unit after the second processing has been performed.

In a sixth aspect according to any one of the first to fifth aspects, the first tray is configured to be vertically displaceable, and a displaceable range of the first tray changes in accordance with an attached or non-attached state of the second unit to the first unit.

In a seventh aspect according to the sixth aspect, in a state where the second unit is not attached to the first unit, a lowerable range of the first tray is larger than that in the attached state.

In an eighth aspect according to the first to seventh aspects, the first processing portion performs end binding processing for binding end portions of a plurality of the media as the first processing.

According to this aspect, in the media processing apparatus, the first processing portion performs the end binding process of binding the end portions of the plurality of the media as the first processing, and the effects of any of the first to seventh aspects can be obtained.

A recording system according to a ninth aspect includes a recording unit that includes a recording portion that performs recording on media, and the media processing apparatus according to any one of the first to eighth aspects, in which the media are received from the first receiving portion after recording has been performed thereon by the recording portion.

According to this aspect, it is possible to provide a recording system that performs processing on the media by the media processing apparatus according to any one of the first to eighth aspects after recording has been performed by the recording portion.

In a tenth aspect according to the ninth aspect, the second processing portion of the second unit performs saddle stitching processing in which centers of a plurality of the media in a width direction are bound and folded as the second processing.

In an eleventh aspect according to the ninth aspect, the second unit has a cover that opens a portion of a media transport path provided therein.

According to this aspect, since the second unit includes the cover that opens a portion of the media transport path provided therein, for example, the clearance of a media jam that has occurred in the media transport path can be easily performed.

In a twelfth aspect according to the ninth aspect, the second unit is located below the recording portion in the vertical direction.

According to this aspect, since the second unit is positioned below the recording portion in the vertical direction, the second unit can be disposed compactly.

In a thirteenth aspect according to any one of the ninth to twelfth aspects, an intermediate unit is further included and the recording portion is configured to eject liquid to the media to perform recording and the intermediate unit sends out the media recorded on by the recording portion from the recording unit to the first receiving portion of the media processing apparatus.

In the case where the recording portion ejects liquid to the media to perform recording, when the media are wet when performing processing in the media processing apparatus, the recording surface may be rubbed, and the integrity of the media may become poor.

According to this aspect, since there is provided an intermediate unit that sends out the media recorded on by the recording portion from the recording unit to the first receiving portion of the media processing apparatus, the transport time for the media to reach the media processing apparatus after recording has been performed can be extended, and the media may be further dried before reaching the media processing apparatus.

An apparatus unit according to a fourteenth aspect is an apparatus unit that attaches to a media processing apparatus that includes a first unit that includes a first receiving portion that receives media, a first processing portion that performs first processing on the media received from the first receiving portion, and a sending portion that sends out media received from the first receiving portion without passing through the first processing portion, and a first tray that is provided outside the first unit and that receives media discharged from the first unit after the first processing has been performed thereon, the apparatus unit being configured to be detachably attached to the first unit below the first tray and including a second receiving portion that receives the media sent from the sending portion and a second processing portion that performs second processing on the media received from the second receiving portion.

According to this aspect, since the apparatus unit that attaches to the media processing apparatus is configured to be detachably attached to the first unit, the media processing apparatus can easily switch between a configuration in which the first unit and the apparatus unit are connected to each other, and which has both a first processing function and a second processing function, and a configuration in which the apparatus unit is detached from the first unit and only the first processing function is provided.

In addition, since the first processing portion and the second processing portion are provided in separate units, it is possible to improve the ease of clearance of a media jam in the apparatus and the ease of maintenance.

In addition, since the apparatus unit is disposed below the first tray, the possibility of the apparatus unit impeding removal of the media discharged to the first tray can be eliminated.

In a fifteenth aspect according to the fourteenth aspect, the second processing portion performs, as the second processing, saddle stitching processing in which centers of a plurality of the media in a width direction are bound and folded.

According to this aspect, in the apparatus unit including the second processing portion that performs saddle stitching processing in which the centers of the plurality of the media in the width direction are bound and folded as the second processing, the same effect as the ninth aspect is obtained.

First Embodiment

Hereinafter, a first embodiment will be described with reference to the drawings. In the XYZ coordinate system illustrated in each drawing, the X-axis direction indicates the apparatus depth direction, the Y-axis direction indicates the apparatus width direction, and the Z-axis direction indicates the apparatus height direction.

Overview of Recording System

Figure 1:
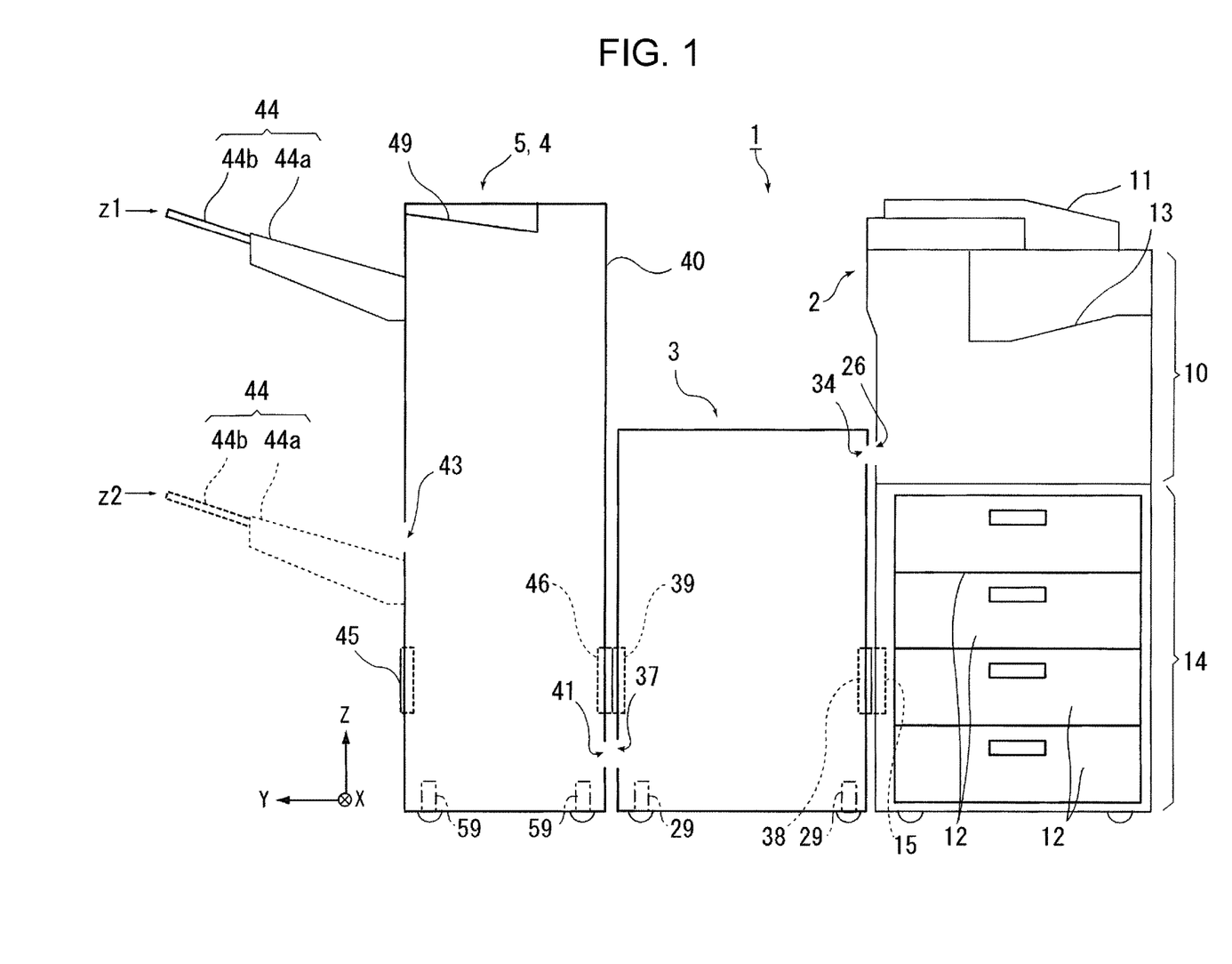
FIG. 1 is a schematic view of a recording system according to a first embodiment.

A recording system 1 illustrated in FIG. 1 includes, for example, a recording unit 2, an intermediate unit 3, and a first unit 5 forming a media processing apparatus 4 in order from right to left in FIG. 1.

Figure 2:
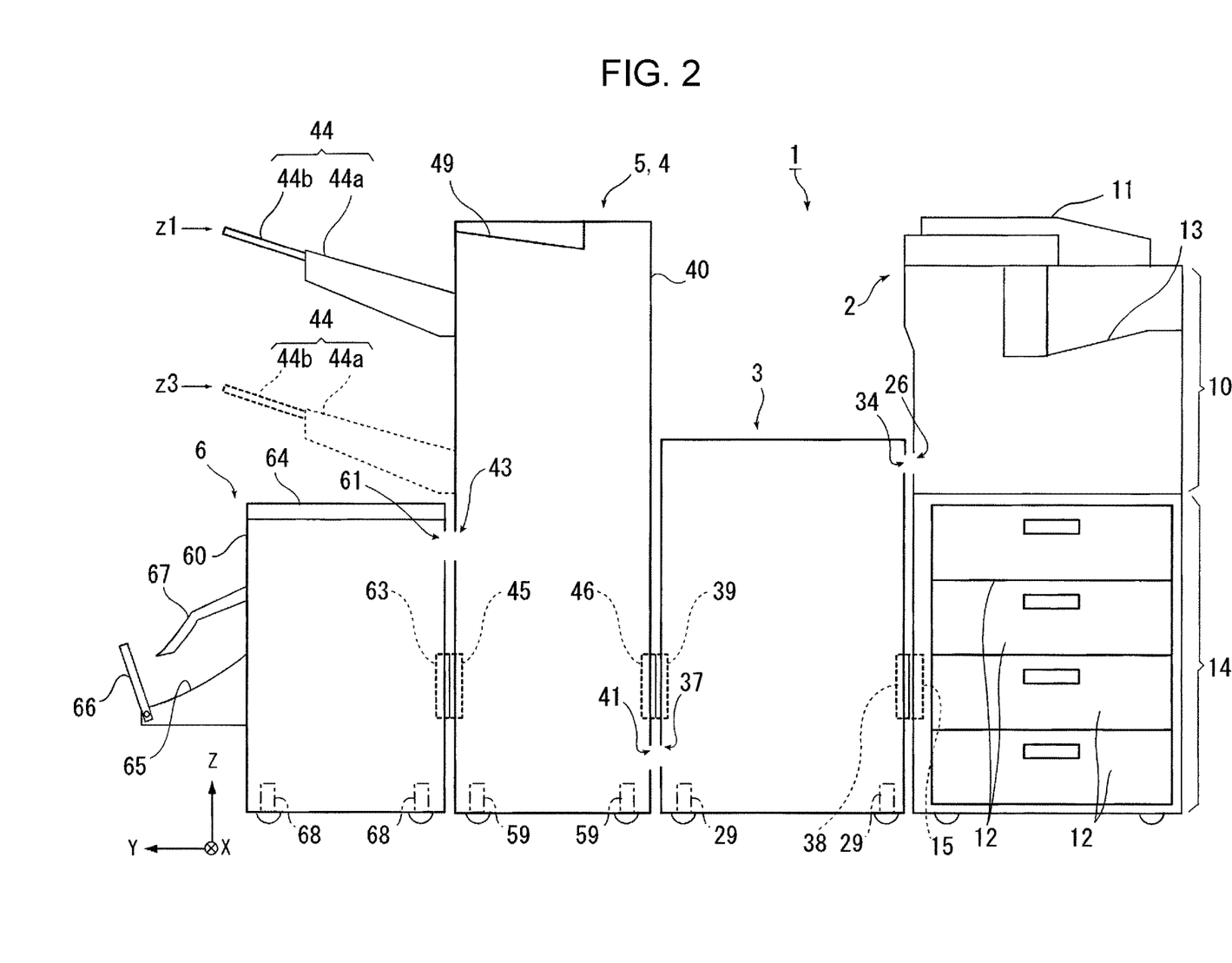
FIG. 2 is a schematic view of a recording system in which a second unit is attached to the media processing apparatus.

In the media processing apparatus 4, as illustrated in FIG. 2, a second unit 6, as an apparatus unit, can be attached to the first unit 5. The second unit 6 is configured to be detachably attached to the first unit 5.

The recording unit 2 performs recording on media to be transported. The intermediate unit 3 receives the media after recording has been performed from the recording unit 2 and sends the media to the media processing apparatus 4. The media processing apparatus 4 performs predetermined processing on the media after recording has been performed in the recording unit 2. Hereinafter, the recording unit 2, the intermediate unit 3, and the media processing apparatus 4 will be described in detail in order.

Recording Unit

The recording unit 2 will be described with reference to FIG. 3. The recording unit 2 is configured as a multifunction apparatus including a printer portion 10 having a line head 20 as a recording portion that records on media, and a scanner portion 11. In the present embodiment, the line head 20 is configured as a so-called ink jet recording head that performs recording by ejecting ink, which is a liquid, onto media.

A cassette housing portion 14 including a plurality of media housing cassettes 12 is provided below the printer portion 10. The media P housed in the media housing cassettes 12 are fed to a recording area through a feeding path 21 illustrated by a solid line in FIG. 3, and a recording operation is performed by the line head 20. The media, after recording has been performed thereon by the line head 20, are sent to either of a first discharge path 22 for discharging the media to a post-recording discharge tray 13 provided above the line head 20 or a second discharge path 23 that sends out the media to the intermediate unit 3.

Figure 3:
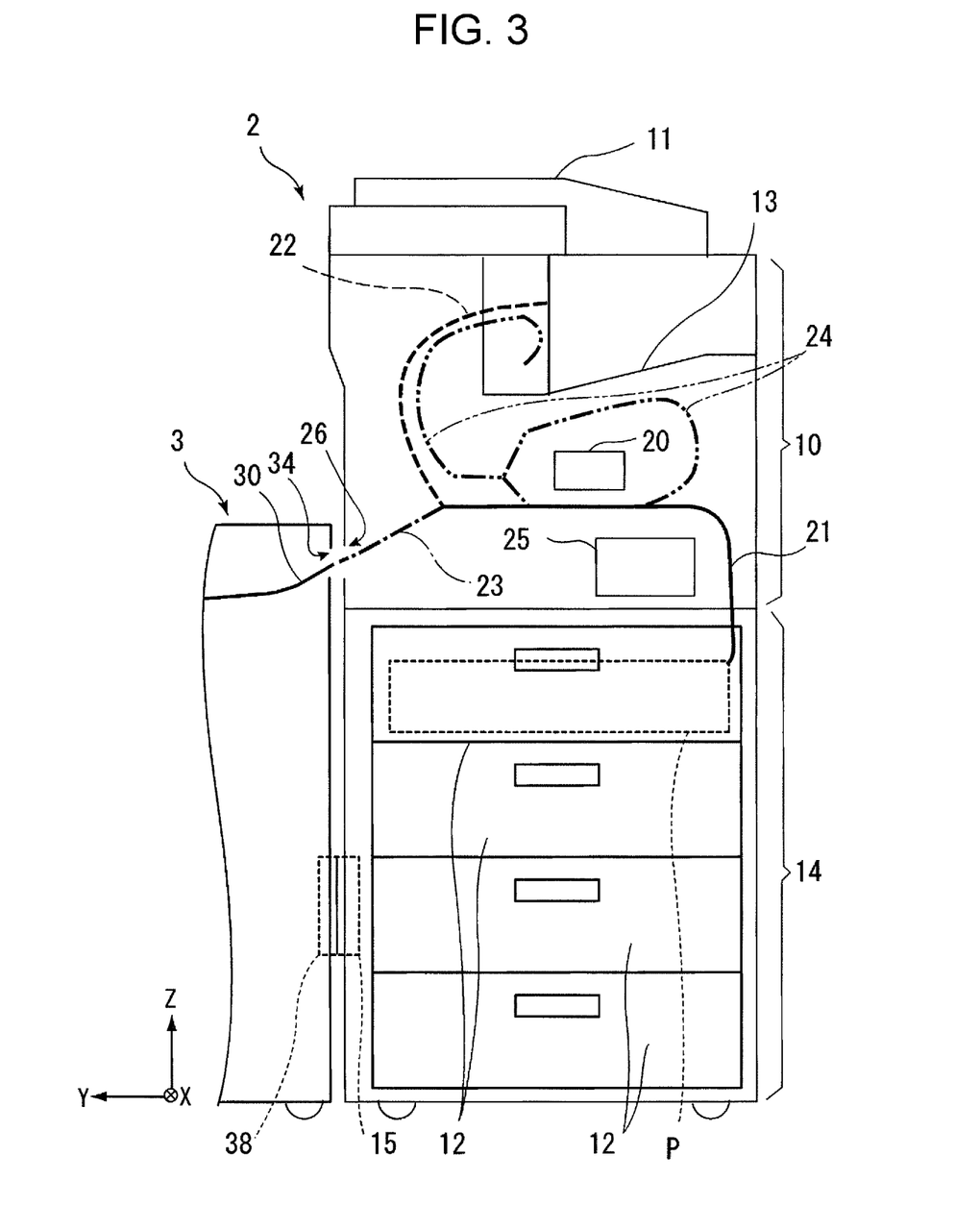
FIG. 3 is a schematic side sectional view illustrating a media transport path in a recording unit.

In FIG. 3, the first discharge path 22 is indicated by a broken line, and the second discharge path 23 is indicated by an alternate long and short dash line. A delivery portion 26 is provided in the +Y direction of the recording unit 2, and the media transported through the second discharge path 23 exit the delivery portion 26 and are sent to an intermediate receiving portion 34 of the intermediate unit 3, which is adjacent thereto.

In addition, the recording unit 2 includes an inverting path 24 indicated by a two-dot chain line in the recording unit 2 of FIG. 1, and, after recording has been performed on a first side of the media, the media are inverted to enable recording to be performed on a second side.

In each of the feeding path 21, the first discharge path 22, the second discharge path 23, and the inverting path 24, a pair of transport roller pairs (not illustrated) are disposed as an example of a way of transporting the media.

The recording unit 2 is provided with a control unit 25 that controls operations related to the transport and recording of the media in the recording unit 2. In the recording system 1, the recording unit 2, the intermediate unit 3, and the media processing apparatus 4 are connected to one another so that the media can be transported from the recording unit 2 to the media processing apparatus 4. The control unit 25 can also control various operations in the intermediate unit 3 connected to the recording unit 2 and the media processing apparatus 4.

The recording system 1 is configured to enable input of settings for the recording unit 2, the intermediate unit 3 and the media processing apparatus 4 from an operation panel (not illustrated). The operation panel can be provided in the recording unit 2 as an example.

Intermediate Unit

Figure 4:
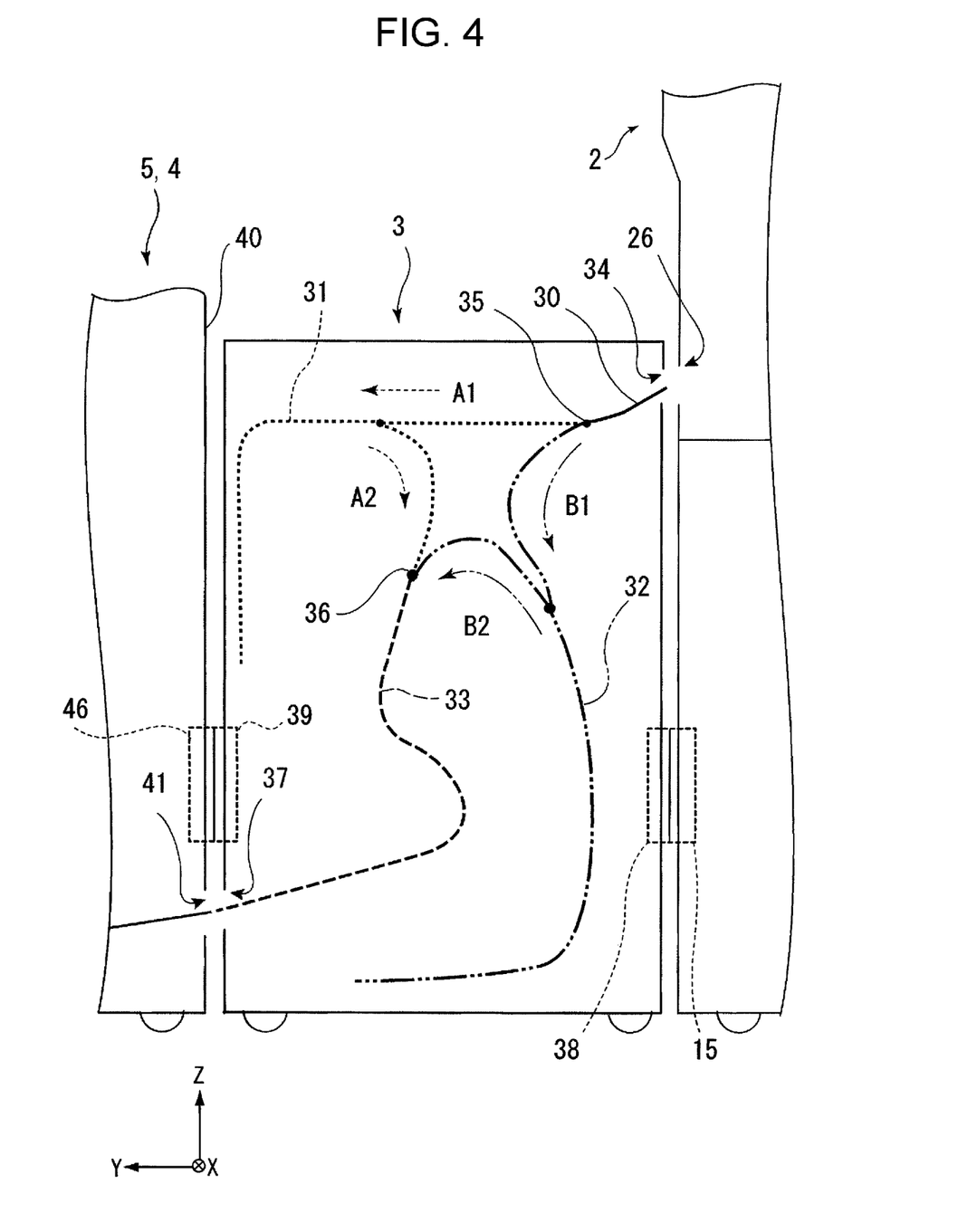
FIG. 4 is a schematic side sectional view illustrating a media transport path in an intermediate unit.

The intermediate unit 3 will be described with reference to FIG. 4. The intermediate unit 3 illustrated in FIG. 4 sends the media recorded on by the line head 20 from the recording unit 2 to a first receiving portion 41 of the media processing apparatus 4. The intermediate unit 3 is disposed between the recording unit 2 and the media processing apparatus 4. The intermediate receiving portion 34 is provided on the −Y direction side of the intermediate unit 3. The recording media sent from the delivery portion 26 through the second discharge path 23 of the recording unit 2 is received from the intermediate receiving portion 34 into a receiving path 30 in the intermediate unit 3 and transported toward the media processing apparatus 4. Further, the receiving path 30 is illustrated by a solid line in FIG. 4.

In the intermediate unit 3, there are two transport paths along which the media are transported. The first transport path is a path through which the media are transported from the receiving path 30 in FIG. 4 through a first switchback path 31 illustrated by a dotted line to a merged path 33. The second path is a path through which the media are transported from the receiving path 30 to the merged path 33 via a second switchback path 32 illustrated by a two-dot chain line in FIG. 4.

The first switchback path 31 is a path that switches back the media in the arrow A2 direction after receiving the media in the arrow A1 direction. The second switchback path 32 is a path for switching back the media in the arrow B2 direction after receiving the media in the arrow B1 direction.

The receiving path 30 branches into the first switchback path 31 and the second switchback path 32 at a branching portion 35. The branching portion 35 is provided with a flap (not illustrated) that switches the destination of the media to either the first switchback path 31 or the second switchback path 32.

In addition, the first switchback path 31 and the second switchback path 32 merge at a merging portion 36. Therefore, even if the media are sent from the receiving path 30 to either the first switchback path 31 or the second switchback path 32, the media can be sent to the media processing apparatus 4 through the merged path 33, which is shared.

An intermediate sending portion 37 is provided on the +Y direction side of the intermediate unit 3, and the media transported on the merged path 33 exit from the intermediate sending portion 37, and are sent to the first receiving portion 41 of the first unit 5 of the media processing apparatus 4.

Further, one or more transport roller pairs (not illustrated) are disposed in each of the receiving path 30, the first switchback path 31, the second switchback path 32, and the merged path 33.

In the case where recording is continuously performed on a plurality of media in the recording unit 2, the media having entered the intermediate unit 3 are alternately sent to the transport path passing through the first switchback path 31 and the transport path passing through the second switchback path 32. By this, it is possible to increase the media transport throughput in the intermediate unit 3.

In addition, as in the line head 20 of the present embodiment, when the recording is performed by ejecting ink (liquid) to the media, if the media are wet when processing is performed by the media processing apparatus 4 in the latter stage, the recording surface may be rubbed or the integrity of the media may become poor.

By transferring the media after recording from the recording unit 2 to the media processing apparatus 4 via the intermediate unit 3, the transport time for the media to reach the media processing apparatus 4 after recording has been performed can be extended, and the media can be further dried before reaching the media processing apparatus 4.

Media Processing Apparatus

Figure 5:
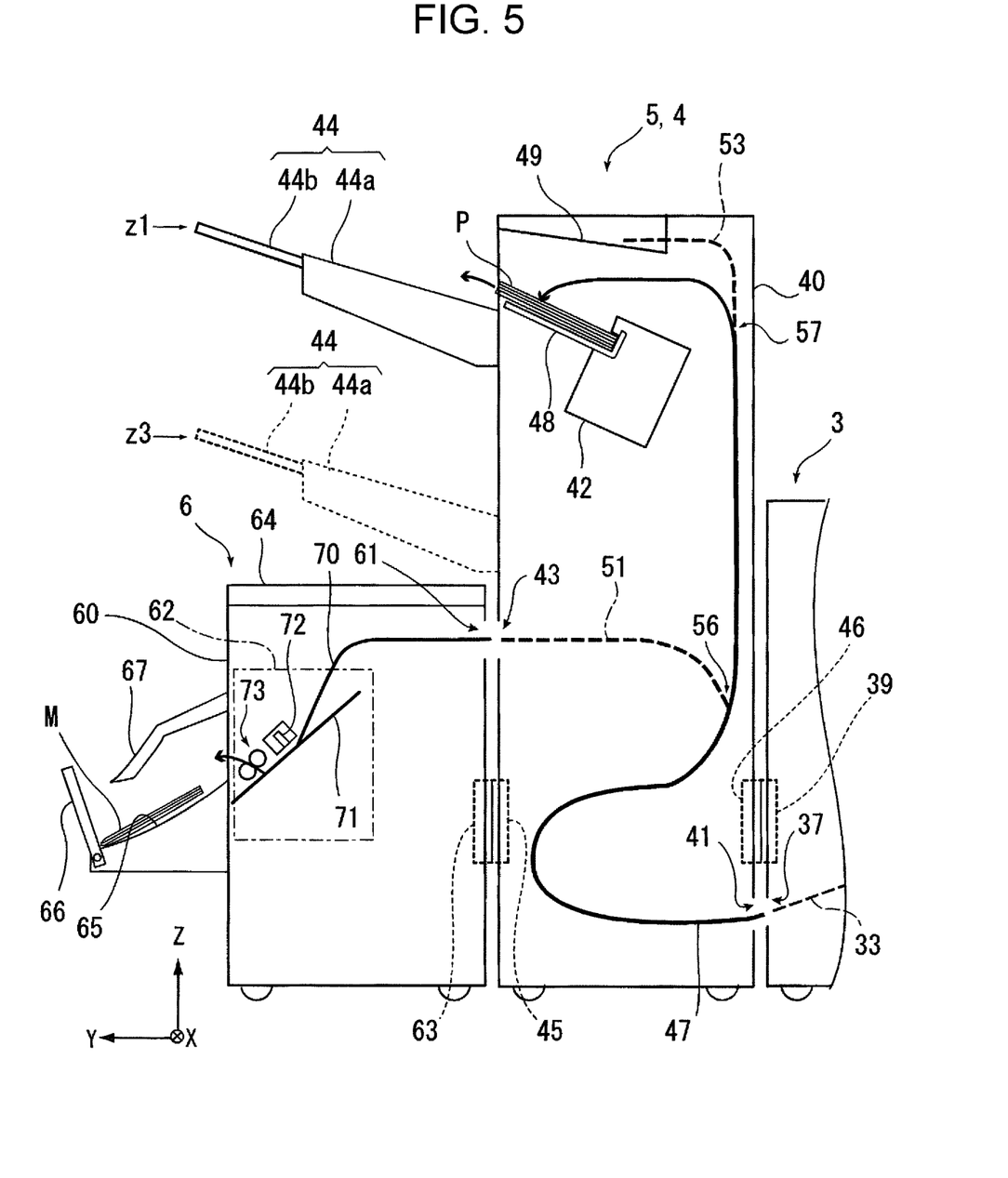
FIG. 5 is a schematic side sectional view illustrating a media transport path in the media processing apparatus.

The media processing apparatus 4 will be described with reference to FIG. 5. The media processing apparatus 4 includes the first unit 5 including the first receiving portion 41 that receives media, a first processing portion 42 that performs first processing on the media received from the first receiving portion 41, and a sending portion 43 that sends out media received from the first receiving portion 41 without passing through the first processing portion 42; and a first tray 44 that is provided outside the first unit 5 and that receives media discharged from the first unit 5 after the first processing has been performed. The first tray 44 is provided so as to protrude in the +Y direction from a first casing 40, which is a casing that forms the external appearance of the first unit 5. In the present embodiment, the first tray 44 includes a base portion 44a and an extension portion 44b, and the extension portion 44b is configured to be storable in the base portion 44a.

In the present embodiment, the first processing portion 42 is a stapler that performs an end binding process in which a plurality of media are stacked and end portions thereof are bound as an example of the "first processing". Further, as the "first processing" performed on the media, a punching process or the like may be performed in which a hole is formed at a predetermined position of the media, in addition to the end binding process.

The first unit 5 is configured such that the second unit 6 can be detachably attached below the first tray 44. FIGS. 5 and 2 illustrate the second unit 6 attached to the first unit 5 below the first tray 44, and FIG. 1 illustrates the second unit 6 removed from the first unit 5 below the first tray 44.

The second unit 6 includes a second receiving portion 61 that receives the media sent out from the sending portion 43 of the first unit 5 and a second processing portion 62 that performs "second processing" on the media received from the second receiving portion 61. In the present embodiment, as an example of the "second processing", the second processing portion 62 performs saddle-stitching processing in which centers of a plurality of media in the width direction are bound and folded. Further, the detailed configuration of the inside of the first unit 5 and the second unit 6 will be described later.

The media processing apparatus 4, since the second unit 6 is configured to be detachably attached to the first unit 5, can easily switch between a configuration having both the first processing function and the second processing function in which the first unit 5 and the second unit 6 are connected to each other as illustrated in FIG. 2, and a configuration, as illustrated in FIG. 1, having only the first processing function in which the second unit 6 is removed from the first unit 5. Therefore, the second processing function provided by the second processing portion 62 provided in the second unit 6 can be easily added to the media processing apparatus 4 having the first processing function by the first processing portion 42 provided in the first unit 5 as an option. Thus, the user has more freedom in selecting required processing functions.

Then, since the second unit 6 attached to the first unit 5 is disposed below the first tray 44, the possibility of the second unit 6 impeding removal of media discharged to the first tray 44 can be eliminated.

In addition, in the first unit 5 and the second unit 6, there is a possibility that a "jam" may occur in which media are clogged inside the apparatus. In the present embodiment, since the first processing portion 42 and the second processing portion 62 are provided as separate units, it is possible to improve the ease of clearance of a media jam in the apparatus and the ease of maintenance.

The first unit 5, includes an attachment portion 45 for attachment of the second unit 6 to the first unit 5 by being connected to an attachment target portion 63 provided in the second unit 6, and the first unit 5 and the second unit 6 are electrically connected by connecting the attachment portion 45 and the attachment target portion 63 to each other. With this configuration, both the mechanical connection and the electrical connection between the first unit 5 and the second unit 6 can be formed by connecting the attachment portion 45 and the attachment target portion 63 to each other. It is also possible to provide a lock portion (not illustrated) for locking the connection of the attachment portion 45 and the attachment target portion 63.

Further, the recording unit 2 and the intermediate unit 3 can be mechanically and electrically connected by connecting a first attachment portion 15 provided in the recording unit 2 and a first attachment target portion 38 provided in the intermediate unit 3. The first unit 5 and the intermediate unit 3 can be mechanically and electrically connected by connecting a second attachment portion 39 provided in the intermediate unit 3 and a second attachment target portion 46 provided in the first unit 5.

In the present embodiment, a second casing 60, which is a casing that forms the external appearance of the second unit 6, overlaps the first tray 44 in a media discharge direction from the first unit 5. With this configuration, the second casing 60 of the second unit 6 can be configured so as not to protrude from the first tray 44 in the media discharge direction, and the media processing apparatus 4 can be disposed in a space-saving manner. In the present embodiment, the media discharge direction from the first unit 5 is a direction along the +Y direction.

Further, the second unit 6, which includes, outside the second casing 60, a second tray 65 that discharges the media after the second processing has been performed in the second processing portion 62, is disposed so as to be partially offset from the first tray 44 in the media discharge direction. Of course, the entirety of the second tray 65 may also be configured to overlap the first tray 44 in the media discharge direction.

First Unit

The first unit 5 will be described with reference to FIG. 5.

The media transported on the merged path 33 of the intermediate unit 3 are sent from the intermediate sending portion 37 to the first receiving portion 41 of the first unit 5. The media received from the first receiving portion 41 to the first unit 5 are transported through a first transport path 47 indicated by a solid line in FIG. 5. The media P transported through the first transport path 47 are sent to a processing tray 48 provided at the upper portion of the first casing 40, and are stacked on the processing tray 48 with their rear ends aligned in the transport direction. When a predetermined number of media P are stacked on the processing tray 48, the first processing portion 42 performs edge stitching processing on the rear ends of the media P. The media are discharged to the first tray 44 by a discharging portion (not illustrated) after the end binding processing has been performed.

The first transport path 47 is provided with a second transport path 51 which branches from the first transport path 47 at a first branch portion 56. The second transport path 51 is a path that is connected to the sending portion 43 and sends the media received from the first receiving portion 41 without passing through the first processing portion 42.

Furthermore, the first transport path 47 is provided with a third transport path 53 which branches from the first transport path 47 at a second branch portion 57 downstream of the first branch portion 56. The third transport path 53 is a path for discharging the media to an upper tray 49 provided on top of the first casing 40. In the upper tray 49, non-treated media can be stacked.

In each of the first transport path 47, the second transport path 51, and the third transport path 53, a pair of transport roller pairs (not illustrated) are disposed as an example of a way of transporting the media. In addition, each of the first branch portion 56 and the second branch portion 57 is provided with a flap (not illustrated) for switching the destination of the media.

Second Unit

The second unit 6 will be described with reference to FIG. 5.

The second unit 6 includes the second receiving portion 61 that receives the media sent out from the sending portion 43 and the second processing portion 62 that performs saddle stitching processing as second processing on the media received from the second receiving portion 61, and is configured to be detachably attached to the first unit 5 below the first tray 44.

More specifically, the media transported on the second transport path 51 of the first unit 5 are sent out from the sending portion 43 to the second receiving portion 61 of the second unit 6. The media received in the second unit 6 from the second receiving portion 61 are transported on a transport path 70 illustrated by a solid line in FIG. 5 and are sent to the second processing portion 62. Also, in the transport path 70, a pair of transport roller pairs (not illustrated) are disposed as an example of a way of transporting the media.

In the second processing portion 62, after the media have been bound, saddle stitching processing (second processing) can be performed to fold the media into a booklet. The bundle of media is discharged to the second tray 65 after the saddle stitching processing has been performed. The second tray 65 includes a restricting portion 66 at the front end in the media discharge direction, and prevents the media bundle discharged to the second tray 65 from protruding from the second tray 65 or falling from the second tray 65 in the media discharge direction. Reference numeral 67 denotes a guide portion 67 which guides the media bundle M discharged from the second casing 60 to the second tray 65.

The second processing portion 62 will be described in more detail with reference to FIGS. 6 and 7.

Figure 6:
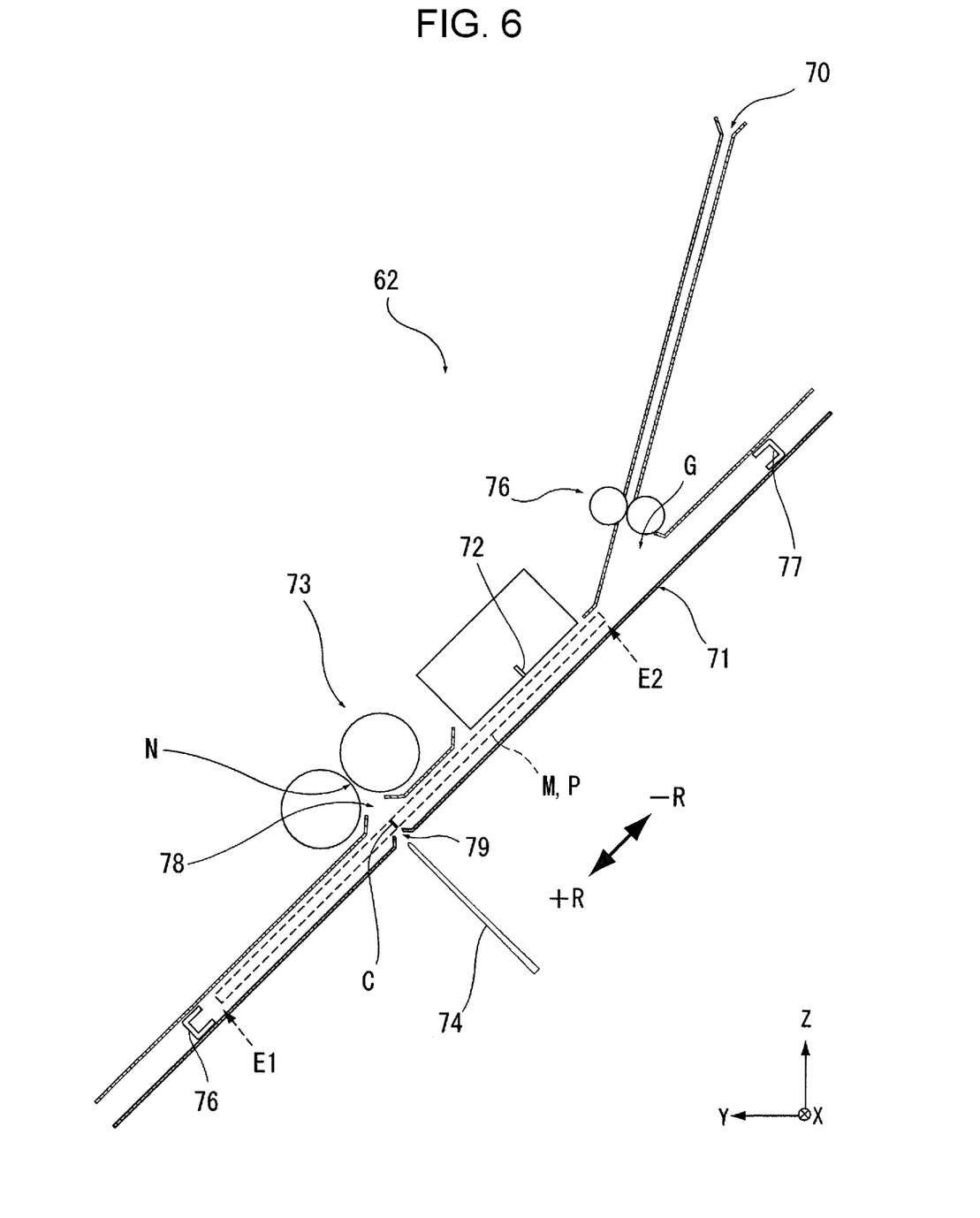
FIG. 6 is a schematic side sectional view illustrating a second processing portion.

The second processing portion 62, as illustrated in FIG. 6, includes a stacking portion 71 on which the media P transported from the transport path 70 are placed; a binding portion 72 for binding a bundle of media M consisting of a plurality of media P stacked in the stacking portion 71 at a binding position C, a folding roller pair 73 that folds the media bundle M at the binding position C, and a blade 74 that causes the binding position C of the media bundle M to be nipped by the folding roller pair 73. In FIG. 6, reference sign G indicates a joining position G where the transport path 70 and the stacking portion 71 join. In addition, the binding position C in the present embodiment is a center portion in the transport direction +R of the media P stacked in the stacking portion 71.

The media P are sent from the transport path 70 to the stacking portion 71 by a feeding roller pair 75.

A first contact portion 76 that can come in contact with the front end E1 of the media P stacked in the stacking portion 71 in the transport direction +R, and a second contact portion 77 that can come in contact with the rear end E2 of the media P stacked in the stacking portion 71 in the transport direction +R are provided in the stacking portion 71 illustrated in FIG. 6.

The first contact portion 76 and the second contact portion 77 are configured to be movable in both the transport direction +R of the media P in the stacking portion 71 illustrated in FIG. 6 and the reverse direction −R. In other words, the first contact portion 76 and the second contact portion 77 are configured to be movable in both directions toward and away from each other.

The first contact portion 76 and the second contact portion 77 can be moved in the transport direction +R and the reverse direction −R, for example, using a rack and pinion mechanism, a belt moving mechanism, or the like operated by the power of a drive source (not illustrated).

Downstream of the joining position G, there is provided the binding portion 72 that binds the media bundle M stacked in the stacking portion 71 at a predetermined position in the transport direction +R. The binding portion 72 is, for example, a stapler. In the present embodiment, a plurality of the binding portions 72 are provided at intervals in the X axis direction, which is the width direction of the media.

The binding portion 72 is configured to bind the media bundle M at the center portion of the media bundle M in the transport direction +R, that is, at the binding position C.

The folding roller pair 73 is provided downstream of the binding portion 72. The stacking portion 71 is open between a nip position N of the folding roller pair 73 to form an entry path 78. An inclined surface that guides the binding position C to the nip position N from the stacking portion 71 is provided at the entrance of the entry path 78.

Figure 7:
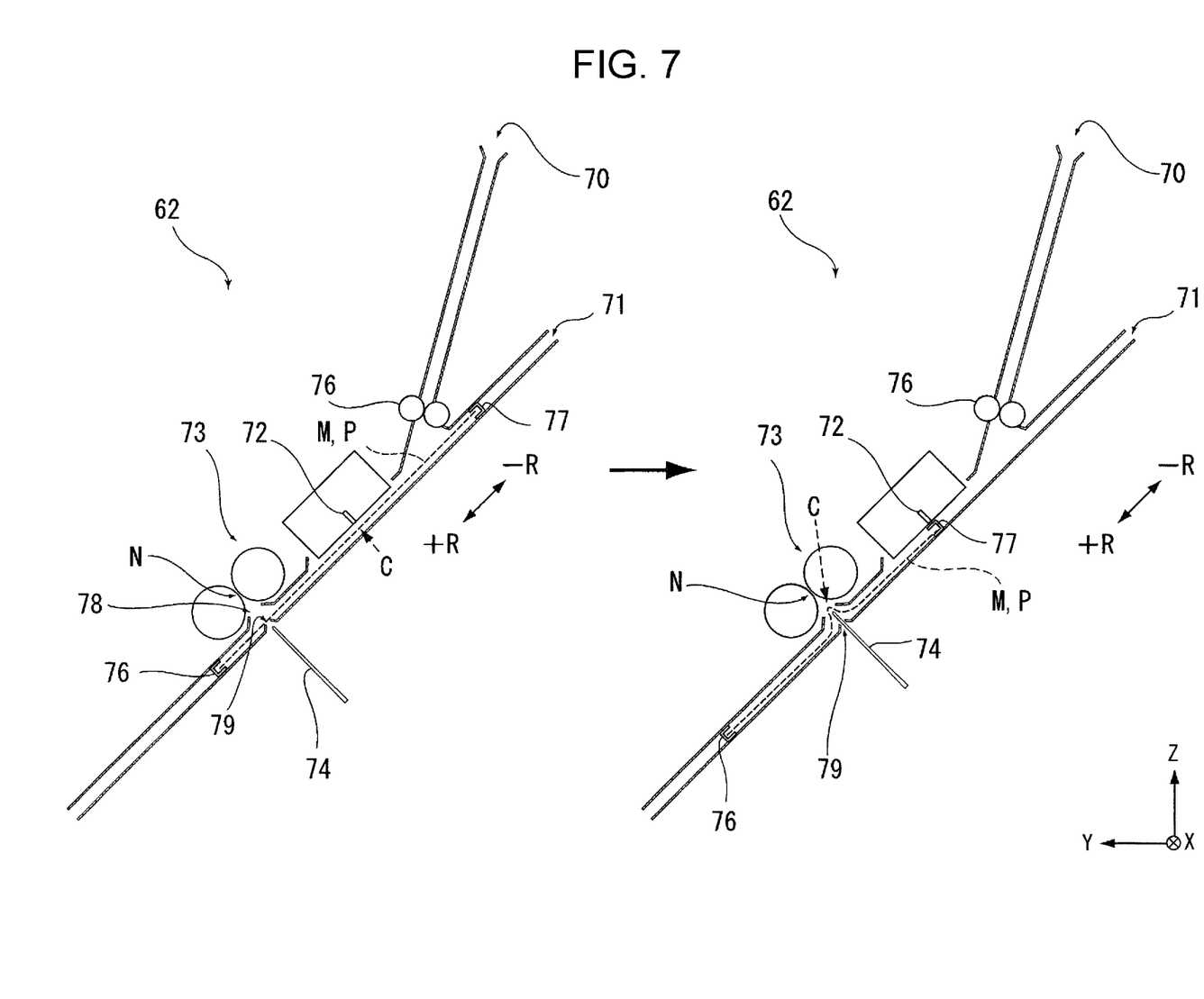
FIG. 7 is a schematic side sectional view for explaining second processing performed by the second processing portion.

The blade 74 that is capable of switching between, as illustrated in FIG. 6 and the left diagram of FIG. 7, a retracted state retracted from the stacking portion 71, and, as illustrated in the right diagram of FIG. 7, an advanced state of being advanced with respect to the binding position C of the media bundle M stacked in the stacking portion 71 is provided on the opposite side of the folding roller pair 73 that interpose the stacking portion 71. Reference numeral 79 denotes a hole 79 through which the blade 74 passes.

When the media bundle M is stacked in the stacking portion 71 as illustrated in FIG. 6, while the first contact portion 76 is in contact with the leading end E1 of the media bundle M, the media bundle M is moved in the −R direction by moving both the first contact portion 76 and the second contact portion 77 in the −R direction. As illustrated in the left view of FIG. 7, the media bundle M is disposed at a position where the binding position C faces the binding portion 72, and the binding portion 72 binds the binding position C of the media bundle M.

Subsequently, while bringing the second contact portion 77 into contact with the rear end E2 of the media bundle M, the media bundle M is moved in the +R direction by moving both the first contact portion 76 and the second contact portion 77 in the +R direction. When the media bundle M is disposed at a position where the binding position C faces the folding roller pair 73, the blade 74 is advanced as illustrated in the right view of FIG. 7. Thereby, the binding position C of the media bundle M is inserted toward the nip position N of the folding roller pair 73. When the binding position C of the media bundle M is nipped by the folding roller pair 73, the media bundle M is discharged toward the second tray 65 (FIG. 5) while being folded by the rotation of the folding roller pair 73.

Further, the second processing portion 62 can provide a folding line forming mechanism that folds the binding position C of the media P in the transport path 70. Because the binding position C is the folding position for the folding roller pair 73, the media bundle M can be easily folded at the binding position C by adding a fold line to the binding position C.

Another Configuration of Media Processing Apparatus

The second unit 6 of the present embodiment includes a cover 64 that opens a portion of the media transport path provided therein. The cover 64 can open the top of the second casing 60 and expose a portion of the transport path 70. By providing the cover 64, for example, the clearance of a media jam that has occurred in the second unit 6 can be easily performed. That is, the ease of maintenance inside the apparatus can be improved.

Further, the cover 64 can also be provided so as to open the front surface (the surface in the −X direction) of the second casing 60 illustrated in FIG. 2. In addition, for example, a handle can be provided on the front of the apparatus, and the front surface of the second casing 60 together with the inside of the apparatus can be pulled out toward the front (−X direction).

In addition, in the present embodiment, as illustrated in FIG. 2, the second unit 6 is positioned in the vertical direction below the line head 20 (recording portion) provided in the recording unit 2. According to this configuration, the second unit 6 can be disposed compactly in the recording system 1.

Further, the second unit 6 is disposed below the printer portion 10 of the recording unit 2, that is, so as to overlap the cassette housing portion 14 in the height direction.

In the recording system 1 illustrated in FIG. 1, the first tray 44 is configured to be displaceable in the height direction (Z-axis direction) with respect to the first casing 40. For example, the first tray 44 can be configured to be displaced by the power of a drive source (not illustrated) along a slide rail (not illustrated) extending along the Z-axis direction in the first casing 40. The first tray 44 can be displaced downward as the number of processed sheets in the first processing portion 42 increases, and the number of stacked media in the first tray 44 can be increased. In the state in FIG. 1 in which the second unit 6 is not attached to the first unit 5, the first tray 44 is configured to be displaceable between a position z1 and a position z2 in the height direction. When the second unit 6 is attached to the first unit 5 as illustrated in FIG. 2, the first tray 44 can be displaced between the position z1 and a position z3 above the position z2.

In addition, the first unit 5 and the second unit 6 can have their positions adjusted in the height direction. As illustrated in FIG. 2, the first unit 5 includes first height adjustment mechanisms 59 in the lower portion of the first casing 40, and the second unit 6 includes second height adjustment mechanisms 68 in the lower portion of the second casing 60.

When there are irregularities or a slope on the ground where the recording system 1 is installed, for example, the position of the attachment portion 45 and that of the attachment target portion 63 for attachment of the first unit 5 and the second unit 6, which are adjacent units, may be shifted in the height direction or the position of the second attachment portion 39 and that of the second attachment target portion 46 for attachment of the intermediate unit 3 and the second unit 6, which are adjacent units, may be shifted in the height direction.

The positional deviation in the height direction of the attachment portion 45 and the attachment target portion 63 or the second attachment portion 39 and the second attachment target portion 46 can be corrected by providing the first height adjustment mechanisms 59 that adjust the position of the first unit 5 in the height direction, and the second height adjustment mechanisms 68 that adjust the position of the second unit 6 in the height direction.

In the present embodiment, the intermediate unit 3 also includes intermediate unit height adjustment mechanisms 29 (FIG. 2), the positions in the height direction of the first attachment portion 15 for attachment of the recording unit 2 and the intermediate unit 3, and the first attachment target portion 38 can be matched.

The recording system 1 can also be configured with the intermediate unit 3 omitted. That is, the recording unit 2 and the media processing apparatus 4 can be connected to each other, and the media can be directly sent to the media processing apparatus 4 without passing through the intermediate unit 3 after recording has been performed in the recording unit 2. In such a configuration, the first receiving portion 41 provided in the first unit 5 is disposed at a height corresponding to the delivery portion 26 of the recording unit 2. In addition, another receiving portion different from the first receiving portion 41 can be provided at a height corresponding to the delivery portion 26 of the recording unit 2 so that the user can select whether to provide the intermediate unit 3 or not.

Further, an apparatus from which the recording function is omitted from the recording system 1 in the present embodiment can be regarded as the media processing apparatus 4.

In addition, it goes without saying that the present disclosure is not limited to the above embodiment, and various modifications are possible within the scope of the disclosure described in the claims, and they are also included in the scope of the present disclosure.

What is claimed is:

1. A media processing apparatus comprising:
a first unit that includes a first inlet that receives media, a first processing portion that performs first processing on the media received via the first inlet, and a media outlet through which media received via the first inlet is sent out without passing through the first processing portion; and a first tray that protrudes outwardly from a casing of the first unit and that receives the media discharged from the first unit after the first processing has been performed thereon, wherein the first unit is configured such that a second unit can be detachably attached below the first tray, the second unit including a second inlet that receives the media sent out from the media outlet, and a second processing portion that performs second processing on the media received via the second inlet, when the second unit is attached to the first unit, the second processing portion does not overlap the first processing portion in a media discharge direction from the first unit.

2. The media processing apparatus according to claim 1, wherein the first unit includes an attachment target portion for attachment of the second unit by being connected to an attachment portion provided on the second unit, and the first unit and the second unit are electrically connected by connecting the attachment portion and the attachment target portion to each other.

3. The media processing apparatus according to claim 1, wherein when the second unit is attached to the first unit, a casing of the second unit overlaps the first tray in a media discharge direction from the first unit.

4. The media processing apparatus according to claim 3, wherein when the second unit is attached to the first unit, a portion of the first tray is provided downstream of the casing in the media discharge direction from the first unit.

5. The media processing apparatus according to claim 1, further comprising:

a second tray that receives the media discharged from the second unit after the second processing has been performed; and wherein when the second unit is attached to the first unit, the first tray is provided to be shifted upstream in a media discharge direction with respect to a portion of.

6. The media processing apparatus according to claim 1, wherein the first tray is configured to be vertically displaceable, and a displaceable range of the first tray changes in accordance with an attached or non-attached state of the second unit to the first unit.

7. The media processing apparatus according to claim 6, wherein in a state where the second unit is not attached to the first unit, a lowerable range of the first tray is larger than that in the attached state.

8. The media processing apparatus according to claim 1, wherein the first processing portion performs end binding processing for binding ends of a plurality of the media as the first processing.

9. A recording system comprising:

a recording unit that includes a head that performs recording on media; and the media processing apparatus according to claim 1, wherein the media are received from the first inlet after recording has been performed thereon by the head.

10. The recording system according to claim 9, further comprising:

a media transporter, wherein the head is configured to eject liquid to the media to perform recording, and the media transporter sends out the media recorded on by the head from the recording unit to the first inlet of the media processing apparatus.

11. The recording system according to claim 9, wherein the first processing portion of the second unit performs saddle stitching processing in which centers of a plurality of the media in a width direction are bound and folded as the second processing.

12. The recording system according to claim 9, wherein the second unit has a cover for opening a portion of a media transport path provided therein.

13. The recording system according to claim 9, wherein the second unit is located below the head in the vertical direction.

14. The recording system according to claim 9, further comprising:

a media transporter, wherein the head is configured to eject liquid to the media to perform recording, and the media transporter sends out the media recorded on by the head from the recording unit to the first inlet of the media processing apparatus.

15. An apparatus unit that attaches to a media processing apparatus that includes a first unit that includes a first inlet that receives media, a first processing portion that performs first processing on the media received from the first inlet, and a media outlet through which media received from the first inlet is sent out without passing through the first processing portion, and a first tray that protrudes outwardly from a casing of the first unit and that receives media discharged from the first unit after the first processing has been performed, the apparatus unit being configured to be detachably attached to the first unit below the first tray and comprising:

a second inlet that receives the media sent out from the media outlet and a second processing portion that performs second processing on the media received from the second inlet, when the second unit is attached to the first unit, the second processing portion does not overlap the first processing portion in a media discharge direction from the first unit.

16. The apparatus unit according to claim 15, wherein the second processing portion performs, as the second processing, saddle stitching processing in which centers of a plurality of the media in a width direction are bound and folded.

17. A media processing apparatus comprising:

a first unit that includes a first inlet that receives media, a first processing portion that performs first processing on the media received via the first inlet, and a media outlet through which media received via the first inlet is sent out without passing through the first processing portion; and a first tray that protrudes outwardly from a casing of the first unit and that receives the media discharged from the first unit after the first processing has been performed thereon, wherein the first unit is configured such that a second unit can be detachably attached below the first tray, the second unit including a second inlet that receives the media sent out from the media outlet, and a second processing portion that performs second processing on the media received via the second inlet, the second processing portion being disposed vertically below a portion of the first tray that protrudes outwardly from the casing.

18. A recording system comprising:
- a recording unit that includes a head that performs recording on media; and
- the media processing apparatus according to claim 17, wherein the media are received from the first inlet after recording has been performed thereon by the head.

19. The recording system according to claim 18, wherein the second processing portion of the second unit performs saddle stitching processing in which centers of a plurality of the media in a width direction are bound and folded as the second processing.

20. The recording system according to claim 18, wherein the second unit has a cover for opening a portion of a media transport path provided therein.

* * * * *